United States Patent [19]

Crawford

[11] 3,859,980
[45] Jan. 14, 1975

[54] SOLAR HEATER

[76] Inventor: F. Robert Crawford, 316 Bayshore Dr., Osprey, Fla. 33559

[22] Filed: Aug. 6, 1973

[21] Appl. No.: 385,829

[52] U.S. Cl. .............................................. 126/271
[51] Int. Cl. ............................................... F24j 3/02
[58] Field of Search ........................... 126/270, 271

[56] References Cited
UNITED STATES PATENTS

| | | | |
|---|---|---|---|
| 2,553,302 | 5/1951 | Cornwall | 126/271 X |
| 3,022,781 | 2/1962 | Andrassy | 126/271 |
| 3,254,643 | 6/1966 | Thomason | 126/271 |
| 3,390,672 | 7/1968 | Snelling | 126/271 |
| 3,599,626 | 8/1971 | Bouse | 126/271 |

FOREIGN PATENTS OR APPLICATIONS 1,161,887  8/1969  Great Britain ..................... 126/271

Primary Examiner—William F. O'Dea
Assistant Examiner—Peter D. Ferguson

[57] ABSTRACT

This invention provides a solar heating unit constituted of any suitable flexible material, such as plastic, so that when not in use or during transportation it may be rolled into a compact structure easily transported and installed. Further the present solar heating unit consists of a plurality of tubes arranged in parallel relation and connected at their ends to manifolds with the two outermost tubes of the unit and the manifolds having a greater outside vertical diameter than the intermediate tubes, and a transparent envelope enclosing the entire unit and held in spaced relation above and below the surfaces of the tubes between the two outermost tubes, thus providing an insulating pocket of air about the tubes to prevent dissipation of heat by convection into the atmosphere surrounding the unit. The present invention further includes a pump for circulating a fluid at low pressure through the tubes and manifolds together with suitable pressure regulating means and check valve means to prevent reverse flow of fluid from the tubes when the pump is shut down.

3 Claims, 3 Drawing Figures

SOLAR HEATER

The prior patent art contains many various types of solar heating units to utilize atmospheric heat to heat water or other fluids, but these devices include rigid structures, such as containing boxes, etc., which render them cumbersome to handle if built up at a point distant to the point at which they are to be used. Many of them require special preparation or a roof, or the like on which they are to be installed, and while they may provide the ultimate result of heating the fluid, as in the present invention, they are more complicated in structure, consequently more expensive to manufacture and far more expensive to install than the present invention which comprises a flexible heating unit utilizing solar energy which unit may be rolled or folded into a compact structure of comparatively light weight and may be easily placed upon a roof or other suitable place of use and unfolded into its operative position.

Another object of this invention is to provide a comparatively flexible and simple solar heating unit which will utilize maximum solar energy and will prevent the convection of heat from its structure by the surrounding atmosphere or by wind.

More specifically the present invention consists of a pair of spaced manifolds and a plurality of tubes connected to and extending between the manifolds, these tubes may be oval in cross section rather than circular and the two outermost tubes of the unit are placed with their maximum diameters at right angles to the maximum diameters of the intermediate tubes, thus the intermediate tubes present a maximum surface to be acted on by the solar energy or heat for heating fluid flowing through them. An envelope of clear material, preferably plastic, encloses the entire unit and the two outermost tubes hold this plastic envelope in spaced relation to provide air insulating spaces both above and below the intermediate tubes in the unit, thus preventing escape of heat from the tubes into the surrounding atmosphere.

However the tubes may be other than oval in shape and in such instances the two outermost tubes and the manifolds will have greater vertical diameters than the intermediate tubes so as to provide the air space between the intermediate tubes and the enclosing envelope.

With these and other objects in view, as may appear from the accompanying specification, the invention consists of various features of construction and combination of parts, which will be first described in connection with the accompanying drawings, showing a solar heater of a preferred form embodying the invention and the features forming the invention will be specifically pointed out in the claims.

Figures 1, 2:
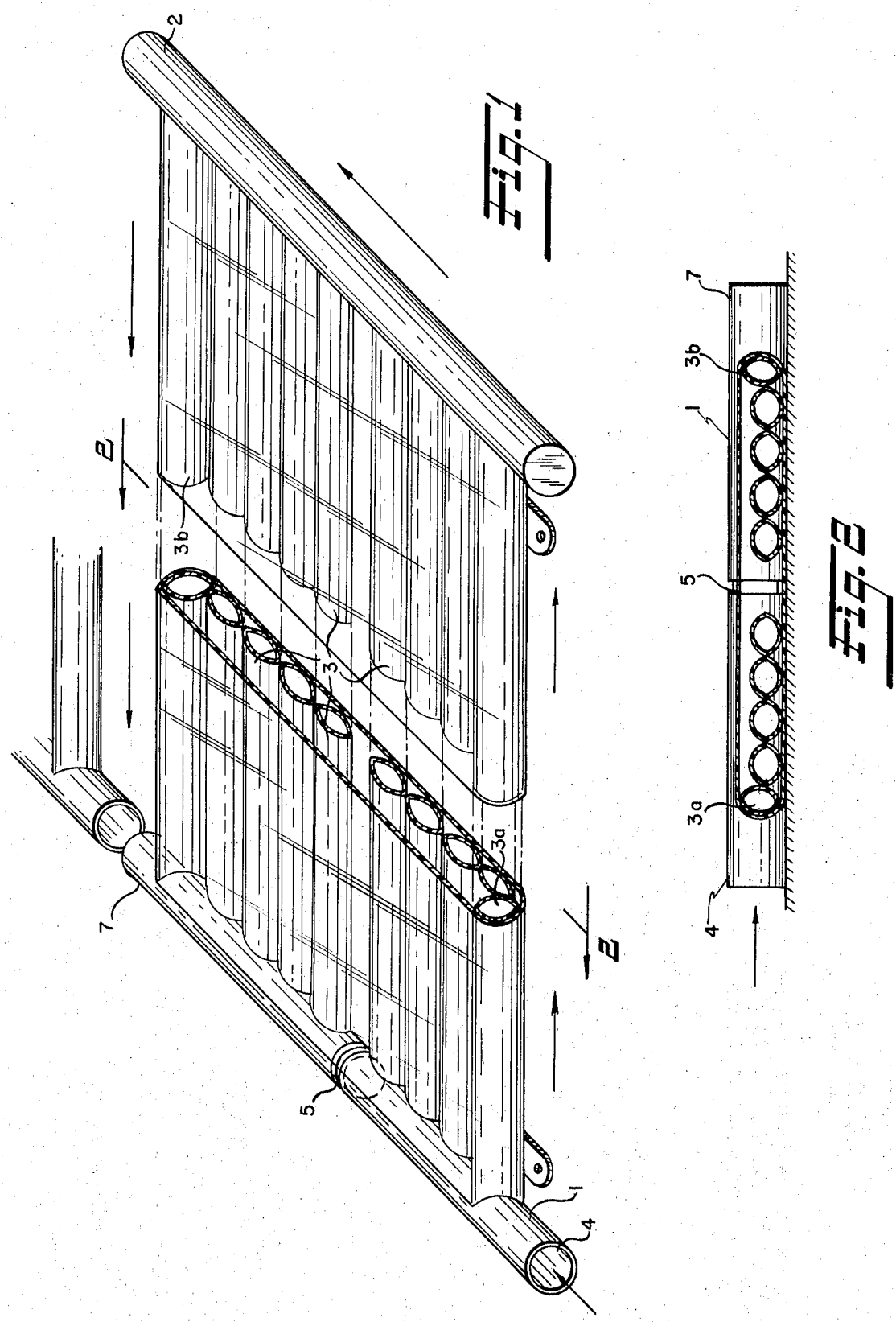
FIG. 1 is a perspective view of the solar heating unit.
FIG. 2 is a fragmentary view in perspective of the unit taken on the lines 2—2 of FIG. 1 and clearly showing the oval diameter of the tubes and enclosing envelope in section.

Referring more particularly to the drawings the solar heating unit as shown in FIG. 1 comprises an inlet and outlet manifold 1 and a circulating manifold 2. Tubes 3 are connected to and connect the two manifolds in a fluid circulating system which enters the inlet manifold 1 at its inlet 4 and is directed through substantially one-half of the tubes connecting the manifolds 1 and 2 to cause the fluid to flow through the tubes into the manifold 2 and then return through the remaining tubes to the manifold 1. A partition 5 (shown in dotted lines in FIG. 1) is placed at the manifold 1 substantially equidistant from its ends to cause the above flow of fluid through the unit.

The tubes 3 are oval in diameter as clearly shown in FIG. 2 and the tubes 3a and 3b at the outer edges of the group of tubes are placed with their maximum diameters perpendicularly while the tubes intermediate these two tubes are placed with their maximum diameters horizontal. In other words, the maximum diameters of the two edged tubes are placed at right angles to the maximum diameters of the intermediate tubes for the purpose hereinafter specified.

The intermediate tubes having their maximum diameters positioned as above specified present a maximum surface to be acted upon by the sun or solar heat. All of the tubes may be made of black material or painted black to prevent reflection of heat from shiny surfaces and to absorb the solar heat for transmission to the fluid flowing through the tubes.

The tubes and the manifolds may be made of any suitable flexible material, such as sheet plastic so that they may be folded or rolled into a compact form for transportation and for facilitating installation.

The entire unit is enclosed in a clear flexible envelope clearly shown in cross section in fragmentary FIG. 2 and this envelope is held spaced from the intermeidate tubes 3 of the unit by the two outside tubes 3a and 3b to provide a space both above and below the intermediate tubes and the envelope. This space provides a sheet of air insulation which prevents the convection of heat from the tubes into the surface on which the unit is mounted and also into the atmosphere above and surrounding the unit and protecting the unit from the cooling effect of winds.

The intake manifold 1 has an inlet at one end which is connected to the source of supply of the fluid to be heated and an outlet 7 at its opposite end through which the heated fluid flows from the unit. In use the outlet 7 may be connected directly to the desired point of use of the heated water or it may be connected to the inlet of a second identical solar heating unit if one unit is unable to provide the desired heating of the fluid flowing therethrough.

It is necessary to provide sufficient force or pressure to the fluid flowing through the unit and to do this an ordinary fluid pump (not shown) together with suitable pressure regulating means (not shown) and both of which are well known and in abundant supply on the open market.

The solar heating unit may be used to heat fluid, such as water or any other suitable fluid which will not chemically react with the plastic tubes.

Due to its flexibility the solar heater unit may be used or placed in any suitable place, such as on the roof of a building, on a driveway or on the ground and it has fasteners 10 attached thereto to hold it in place when installed and prevent displacement by wind, gravity, or circulation of the fluid.

The solar heating unit may be used for, but its use is not specifically restricted to, heating water for swimming pools, heating water for residential heating systems, or for pre-heating water for domestic electric, gas, or oil fired domestic hot water heaters, or the fluid may be heated in the solar unit and delivered to an insulated cistern or container so that heated fluid may be stored up during sunshine for use on cool cloudy days or at night when the heating of the fluid in the heater will not be of suficient degree to provide the desired heat at the point of use of the heated fluid.

Figure 3:
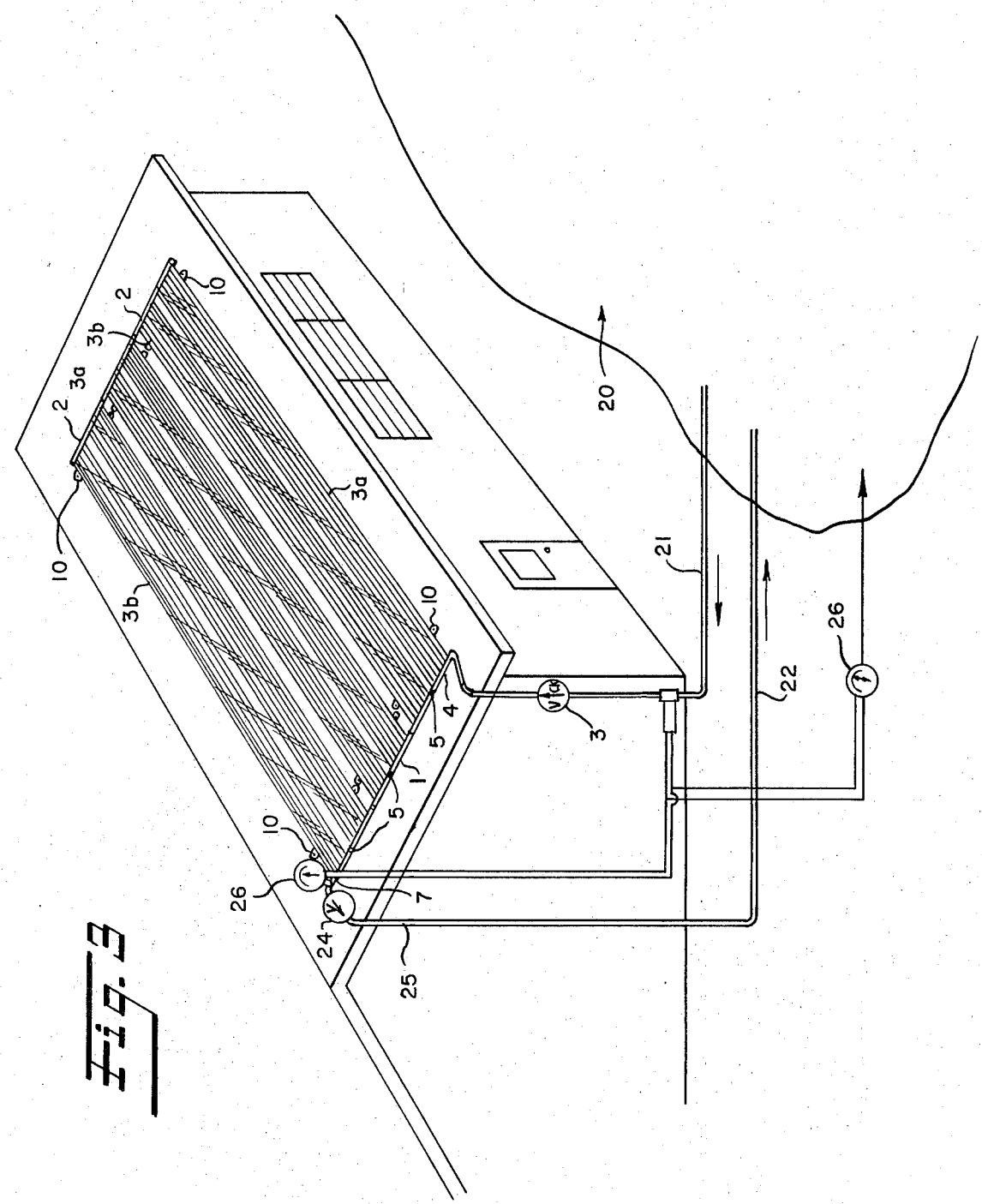
FIG. 3 is a view showing a solar heating unit connected for heating the water in a swimming pool.

FIG. 3 of the drawings illustrates the use of the solar heater above described for heating water in a swimming pool 20. The swimming pool is both the source of supply for water to the heater and the recipient of the heated water. A suitable pump (not shown) is provided to pump water from the swimming pool through the inlet pipe 21 to and through the heater and out of the heater through its outlet and through pipe 22 back to the pool. A check valve 23 is installed in the cool water inlet pipe 21 to prevent cool water from flowing back into the pool from the heating system when the pump is shut off and a pressure valve 24 is installed in the heated water outlet pipe 25 to maintain the desired low pressure of fluid in the heater and to prevent syphoning off water when the circulating pump is shut off.

A thermostat 26 is installed at the top of the solar heater and this thermostat may be set to turn on the circulating pump whenever the temperature reaches a predetermined reading and a second thermostat is placed in the pool and set to turn off the circulating pump whenever the temperature of the water in the pool reaches a predetermined desirable degree.

The system just disclosed for use in connection with the heating of water in a swimming pool may be used in any other system where heated water is desired, such as heating a dwelling or building to supply initially heated water to a fuel operated water heater unit or for storage in an insulated container as hereinabove referred to.

The flexible nature of the plastic material used in the construction of the heater prevents damage by freezing.

From the foregoing description and the accompanying drawings it will be apparent that a solar heating unit is provided which is simple and relatively inexpensive in construction, is flexible when free of fluid and may be folded or rolled into compact form thus facilitating shipment and installation and wherein when in use the shape and function of the heater is maintained by pressure of the fluid exerted within the tubes and manifolds. The envelope forming the insulating air space is kept taut in position by the arrangement of tubes 3a and 3b in the vertical position. Thus, no glass or other rigid transparent cover over the device is required.

Fabrication of the entire device from plastic sheeting permits the heater to be rolled up or folded when empty. This greatly reduces shipping and handling costs when the device is marketed. No structural changes or modifications need to be made to a building on which the heater is placed. In addition, the heater may be readily disconnected and stored when not in use, for example, during winter months in northern climates.

It will be understood that the invention is not to be limited to the specific construction or arrangement of parts shown, but that they may be modified within the invention defined by the claims.

What is claimed is:

1. A solar heater constructed of flexible material including an inlet and outlet manifold and a second fluid flow guiding manifold, a plurality of tubes of flexible material connecting said manifolds and being oval shaped in cross section, said tubes arranged in parallel relation and all of the tubes between the two outermost tubes being placed with their maximum diameters in a horizontal position to present a maximum surface to action of solar heat, said inlet and outlet manifold having an inlet thereto for receiving a cold fluid and an outlet at its other end for delivery of heated fluid from the tubes and a partition in the inlet and outlet manifold intermediate its ends for providing the desired direction of flow of fluid through the tubes, with the two outermost tubes of the plurality of parallel tubes connecting said manifolds being placed with their maximum diameters at right angles to the maximum diameters of the intermediate tubes and a transparent flexible envelope enclosing said heating unit and being held by said outermost tubes in spaced relation from the surfaces of the intermediate tubes to provide air insulating spaces between the tubes and the envelope to retard convection of heating from the tubes.

2. A solar heater as claimed in claim 1, wherein at least the surfaces of the manifolds and tubes exposed directly to solar energy are blackened.

3. A solar heater as claimed in claim 1, wherein said tubes, manifolds, and envelope are made of sheet plastic.

* * * * *